(12) United States Patent
Dou et al.

(10) Patent No.: US 11,060,166 B2
(45) Date of Patent: Jul. 13, 2021

(54) METHOD FOR PREPARING TITANIUM ALLOYS BASED ON ALUMINOTHERMIC SELF-PROPAGATING GRADIENT REDUCTION AND SLAG-WASHING REFINING

(71) Applicant: Northeastern University, Shenyang (CN)

(72) Inventors: Zhi he Dou, Shenyang (CN); Ting an Zhang, Shenyang (CN); Yan Liu, Shenyang (CN); Guo zhi Lv, Shenyang (CN); Qiu yue Zhao, Shenyang (CN); Li ping Niu, Shenyang (CN); Da xue Fu, Shenyang (CN); Wei guang Zhang, Shenyang (CN)

(73) Assignee: NORTHEASTERN UNIVERSITY, Shenyang (CN)

( * ) Notice: Subject to any disclaimer, the term of this patent is extended or adjusted under 35 U.S.C. 154(b) by 345 days.

(21) Appl. No.: 16/320,000

(22) PCT Filed: May 21, 2018

(86) PCT No.: PCT/CN2018/087692
§ 371 (c)(1),
(2) Date: Jan. 23, 2019

(87) PCT Pub. No.: WO2018/228142
PCT Pub. Date: Dec. 20, 2018

(65) Prior Publication Data
US 2019/0241994 A1    Aug. 8, 2019

(30) Foreign Application Priority Data

Jun. 13, 2017 (CN) .......................... 201710443771.1

(51) Int. Cl.
| | | |
|---|---|---|
| *C22B 34/12* | (2006.01) | |
| *C22C 1/06* | (2006.01) | |
| *C22C 1/02* | (2006.01) | |
| *C22C 14/00* | (2006.01) | |
| *C22B 7/04* | (2006.01) | |
| *C22B 9/10* | (2006.01) | |

(52) U.S. Cl.
CPC ............ *C22B 34/1277* (2013.01); *C22B 9/10* (2013.01); *C22B 34/1295* (2013.01); *C22C 1/02* (2013.01); *C22C 1/06* (2013.01); *C22C 14/00* (2013.01)

(58) Field of Classification Search
CPC .............. C22B 34/1263–1277; C22B 34/1295
USPC ....................................................... 75/614
See application file for complete search history.

(56) References Cited

U.S. PATENT DOCUMENTS

| | | | | | |
|---|---|---|---|---|---|
| 3,625,676 | A | * | 12/1971 | Perfect .................. | C22C 27/025 420/552 |
| 4,169,722 | A | * | 10/1979 | Fletcher .................... | C22B 5/04 420/417 |
| 4,373,947 | A | * | 2/1983 | Buttner ............... | C22B 34/1268 75/228 |
| 2010/0015003 | A1 | * | 1/2010 | Adam ....................... | C22B 5/18 420/418 |
| 2010/0064852 | A1 | * | 3/2010 | Zhang ................. | C22B 34/1286 75/366 |
| 2013/0164167 | A1 | * | 6/2013 | Cox .......................... | C25C 3/28 420/418 |
| 2018/0073101 | A1 | * | 3/2018 | Cox ......................... | C22C 14/00 |

FOREIGN PATENT DOCUMENTS

| | | | | | |
|---|---|---|---|---|---|
| CN | 101619405 | A | * | 1/2010 | ......... C22B 34/1277 |
| CN | 104120304 | A | * | 10/2014 | |
| CN | 104131128 | A | | 11/2014 | |
| CN | 104131178 | A | * | 11/2014 | |
| CN | 105132724 | A | | 12/2015 | |
| CN | 107151752 | A | | 9/2017 | |
| CN | 107641726 | A | * | 1/2018 | |
| GB | 2158102 | A | * | 11/1985 | ......... C22B 34/1277 |

(Continued)

OTHER PUBLICATIONS

Friedrich B, Generation of low oxygen Ti—Al—V from oxidic raw materials via aluminothermic reduction (ATR), subsequent refining via electroslag remelting (ESR) and vacuum arc remelting (VAR) (Year: 2018).*

(Continued)

*Primary Examiner* — Alexandra M Moore
*Assistant Examiner* — Austin Pollock
(74) *Attorney, Agent, or Firm* — Muncy, Geissler, Olds & Lowe, P.C.

(57) ABSTRACT

The invention relates to a method for preparing titanium alloys based on aluminothermic self-propagating gradient reduction and slag-washing refining, and belongs to the technical field of titanium-aluminum alloys. The method comprises the following steps of pre-treating raw materials, weighing the raw materials in the mass ratio of rutile or high-titanium slags or titanium dioxide to aluminum powder to $V_2O_5$ powder to CaO to $KClO_3$ being 1.0:(0.60-0.24):(0.042-0.048):(0.12-0.26):(0.22-0.30), performing an aluminothermic self-propagating reaction in a gradient feeding manner to obtain high-temperature melt, performing a gradient reduction melting, performing heat insulation and separating the melt after the feeding is completed, then adding $CaF_2$—CaO—$TiO_2$—$V_2O_5$ based refining slags into the high-temperature melt, performing slag washing refining, and finally removing slags to obtain titanium alloys. This method has the advantages including short flow, low energy consumption, easy operation, easy control on Al and V contained in alloys, and so on.

9 Claims, No Drawings

(56) References Cited

FOREIGN PATENT DOCUMENTS

| JP | 2009029661 A | | 2/2009 |
|---|---|---|---|
| RU | 2206628 C2 | * | 6/2003 |
| RU | 2331676 C2 | * | 8/2008 |

OTHER PUBLICATIONS

Gao Z., et al; "Preparation of Ti—Al—V Alloy by Aluminothermic Reaction", Energy Technology 2016, (Year: 2016).*
Cheng C., et al.; "Synthesis of As-Cast Ti—Al—V Alloy from Titanium-Rich Materials by Thermite Reduction", The Minerals, Metals, & Materials Society, vol. 69, No. 10, 2017 (Year: 2017).*
Nersisyan, H. H. et al., "Effective Two-Step method for Producing Ti—6Al—4V Alloy Particles with Various Morphologies", Powder Technology, Jan. 11, 2014, p. 57-62, vol. 254, ISSN: 0032-5910.

* cited by examiner

METHOD FOR PREPARING TITANIUM ALLOYS BASED ON ALUMINOTHERMIC SELF-PROPAGATING GRADIENT REDUCTION AND SLAG-WASHING REFINING

TECHNICAL FIELD

This invention relates to the technical field of titanium-aluminum alloys, in particular to a method for preparing titanium alloys based on aluminothermic self-propagating gradient reduction and slag-washing refining.

BACKGROUND OF THE INVENTION

Titanium alloys have excellent properties of small specific gravity, high specific strength, good high-temperature performance, well resistant to acid and alkali erosion, good biocompatibility and the like. So, titanium alloys are widely applied to fields of aerospace, shipbuilding, national defense, military industry, biomedicine and the like, thereby possessing a very huge future market. Currently, the annual yield of global processed titanium alloy materials has reached over 40 thousand tons. Among nearly 30 titanium alloy designations, Ti-6Al-4V (TC4) is one of the most widely used titanium alloys as well as a predominant material in titanium alloy applications in countries all over the world, and has an application rate of 50% or above of the total titanium alloy yield, accounting for 95% of all titanium alloy workpieces. Ti-6Al-4V alloys are equiaxial martensite-type two-phase ($\alpha+\beta$) titanium alloys developed by US Illinois Institute of Technology in 1954, and possess superior strength, toughness, plasticity, formability, weldability, heat resistance, corrosion resistance and biocompatibility. It was firstly applied to the astronautics industry, and with the progress in science and technology, the alloys began to be used for fields of military industry, biomedicine, automobile industry, marine engineering, safety and protection, sports and leisure goods and the like, and have been developed into the currently most widely applied titanium alloys with the highest yield. Besides, due to the widespread use of Ti-6Al-4V alloy, it has the most studies on its preparation methods, structural property analysis and applications, and therefore it has become a typical representative of titanium alloys.

Currently, the industrial production manners of Ti-6Al-4V alloy include vacuum fusion casting and powder metallurgy method. The vacuum fusion casting method takes titanium sponge as a raw material and comprises the following steps: adding intermediate alloying elements according to target alloys, performing sufficient mixing, pressing and welding into electrodes, performing melting in an arc melting furnace, an electron beam melting furnace or a plasma melting furnace, performing casting into ingots, and performing heat treatment to obtain finished products. The powder metallurgy method is also called a blending element (BE) method and is a near net shaping technology for producing complex-shape parts. The powder metallurgy method has the advantages including short technological flow, high utilization rate of materials, fine and uniform structure, controllable in ingredients, near in net shaping, and the like. It is an ideal technology for preparing high-performance and low-cost titanium alloys. The method comprises the following steps: mixing titanium powder with element powder in proportion according to alloy ingredients, performing shaping through die pressing or cold isostatic pressing, performing sintering in vacuum condition, and then performing heat treatment to prepare finished products. However, both methods take titanium sponge or titanium powder as a raw material, while a conventional Kroll method for industrially preparing titanium sponge is a complex technological process with long flow, high energy consumption and high pollution. This is the main reason for causing titanium alloys to be high in price and limited in its applications. A molten salt electrolysis method is a current research focus on using titanium oxide to directly prepare titanium alloys. $TiO_2$ is electrolyzed in melt $CaCl_2$ to directly prepare titanium alloys with low oxygen content. However, the method has the disadvantages of immature technological conditions, low current efficiency, low production efficiency, and the like. If titanium-based alloys can be directly prepared from titanium oxides and a certain quantity of oxides of alloying elements by a metallothermic reduction method (such as aluminothermic method), a complex technological process for producing titanium sponge can be avoided, and therefore, the technological cost of titanium alloys can be greatly reduced. The aluminothermic method has the advantages of being rapid in reaction, low energy consumption, and the like. Therefore, direct preparation of titanium-based alloys by using titanium oxides and oxides of titanium alloying elements as raw materials by the aluminothermic method is a promising approach for reducing the cost of titanium alloys. As a main $\alpha$ phase stable element of titanium alloys, aluminum elements mainly play a role in solid solution strengthening. Whenever 1% of Al is added, the tensile strength at room temperature is increased by 50 MPa. The solubility limit of aluminum in titanium is 7.5%. However, once the solubility limit is exceeded, ordered phase $Ti_3Al$ ($\alpha_2$) appears in the structure, which deteriorated the plasticity, toughness and stress corrosion of alloys. For this reason, the amount of aluminum added usually does not exceed 7%, and the aluminum content is even lower in some titanium alloys. Therefore, it seems particularly important to control the aluminum content in titanium alloys. However, because $TiO_2$ cannot be thoroughly reduced in the aluminothermic reduction process, it is easy for titanium and aluminum in the alloys to produce a Ti—Al intermetallic compound. Therefore, the aluminum content in the alloys becomes high ($\geq$10%), and it is difficult to control the aluminum content in the alloys through material proportion in the self-propagating reaction process.

In order to overcome the defects of long technological flow, high energy consumption, high cost and the like of a conventional titanium alloy preparation process, and the difficulty to control the aluminum content in the preparation process of titanium alloys by aluminothermic method, the present invention provides a new method for preparing titanium alloys from rutile, high-titanium slags or titanium dioxide as a raw material based on aluminothermic reduction and slag-washing refining.

SUMMARY OF THE INVENTION

In order to solve the problems such as incomplete reduction of $TiO_2$, high aluminum residue content, high oxygen content, and the like that exist in the conventional external aluminothermic method for preparing ferrotitanium alloys, the present invention provides a method for preparing titanium alloys from high titanium slags, rutile or titanium dioxide as a raw material based on aluminothermic self-propagating gradient reduction and slag-washing refining. The method is based on an aluminothermic self-propagating reaction, that is, the method comprises the following steps of taking rutile, high-titanium slags or titanium dioxide, aluminum powder and the like as raw materials, performing aluminothermic self-propagating reaction in a gradient feeding manner to obtain high-temperature melt, performing gradient reduction melting, controlling the reaction process and temperature and thorough reduction of metal oxides in a batch feeding manner or a continuous feeding manner, performing heat insulation and melt separation after feeding, adding high-alkalinity $CaF_2$—$CaO$—$TiO_2$—$V_2O_5$ based refining slags into the high-temperature melt, adjusting the alkalinity and the melting point of the slags, washing the slags for refining, finally cooling the high-temperature melt to room temperature, and removing melting slags on a top to obtain titanium alloys namely titanium-aluminum-vanadium alloys.

The method for preparing titanium alloys based on aluminothermic self-propagating gradient reduction and slag-washing refining comprises the following steps:

Step 1: Material Pre-Treatment pre-treating aluminothermic reduction reaction materials separately to obtain pre-treated aluminothermic reduction reaction materials, wherein the aluminothermic reduction reaction materials include titanium-containing material, aluminum powder, $V_2O_5$ powder, CaO and $KClO_3$, the titanium-containing material is at least one selected from the group consisting of rutile, high-titanium slags and titanium dioxide;

weighing the pre-treated aluminothermic reduction reaction materials with a proportional ratio, wherein the proportional ratio is a mass ratio of titanium-containing material: aluminum powder:$V_2O_5$ powder:CaO:$KClO_3$ being 1.0: (0.60-0.24):(0.042-0.048):(0.12-0.26):(0.22-0.30);

wherein the particle size of the aluminothermic reduction reaction materials is as follow: rutile and high-titanium slags no larger than 3 mm, titanium dioxide no larger than 0.02 mm, and aluminum powder, $V_2O_5$ powder, CaO and $KClO_3$ no larger than 2 mm, 0.2 mm, 0.2 mm and 2 mm, respectively;

Step 2: Aluminothermic Self-Propagating Reaction Performing Gradient Aluminothermic Reduction with One of the Two Following Feeding Manners:

feeding manner I:

mixing the weighed aluminothermic self-propagating reaction materials other than aluminum powder uniformly to obtain a material mixture, and dividing the material mixture into several parts;

then assigning aluminum powder to each part of the material mixture according to the sequence of each part of the material mixture being fed into a reaction furnace, and gradually reducing the amount of aluminium powder assigned from 1.15-1.35 times of the stoichiometric ratio to 0.85-0.65 times of the stoichiometric ratio;

wherein, the total mass of the amount of aluminum powder added obtained from a chemical reaction equation is a theoretical total mass $m_t$, and the actual total mass of the addition of aluminum powder is $m_a$, wherein $$m_a = m_t \times (95-100)\%;$$

wherein, the mass of a part of the material mixture that is fed into the reaction furnace as a first batch accounts for 10-30% of the mass of the total material mixture, the first batch of the material mixture requires an addition of magnesium powder as an ignition substance to ignite the material mixture to induce a self-propagating reaction, so that a first-batch high-temperature melt that is sufficient to initiate subsequent reactions is obtained;

feeding other parts of the material mixture into the reaction furnace according to a sequence with reduced stoichiometric ratio of the amount of aluminium powder assigned until all materials being fully reacted to obtain high-temperature melt;

feeding manner II:

mixing the aluminothermic self-propagating reaction materials other than aluminum powder uniformly to obtain a material mixture, and then feeding the material mixture into a continuous material mixer at a constant flow rate;

at the same time, adding aluminum powder into the continuous material mixer at a flow rate with reduced gradient, so that the amount of aluminum powder assigned to the continuously fed material mixture being gradually reduced from 1.15-1.35 times of the stoichiometric ratio to 0.85-0.65 times of the stoichiometric ratio, wherein the times of gradient changes of the amount of aluminum powder assigned conforms the following relational formula:

$$m = (b-c) \div a \qquad (1);$$

wherein, m is the times of gradient changes of the amount of aluminum powder assigned, b is the maximum amount of aluminum powder assigned, c is the minimum amount of aluminum powder assigned, a represents a coefficient for gradient changes of the amount of aluminum powder assigned, and $0 < a \leq 0.04$;

wherein, the total mass of the amount of aluminum powder added obtained from the chemical reaction equation is a theoretical total mass $m_t$, and the actual total mass of the addition of aluminum powder is $m_a$, wherein $$m_a = m_t \times (95-100)\%;$$

mixing the aluminothermic self-propagating reaction materials uniformly in the continuous material mixer, and continuously feeding the material mixture into the reaction furnace for aluminothermic reduction reaction until all materials being fully react so as to obtain high-temperature melt;

Step 3: Melt Separation Under Electromagnetic Field heating the high-temperature melt through electromagnetic induction to perform heat insulation and melt separation, and to realize slag-metal separation to obtain a layered melt with an upper layer being aluminum oxide based melt slags as and a lower layer being alloy melt, wherein the temperature is controlled within the range of 1700-1800° C. and the heat insulation time is 5-25 minutes in the melt separation process;

Step 4: Slag Washing Refining (1) removing 85-95% of total volume of the aluminum oxide based melt slags at the upper layer, stirring the remaining aluminum oxide based melt slags and the alloy melt at the lower layer by an eccentrically mechanical stirring at a stirring speed of 50-150 rpm under a temperature range of 1700-1800° C.;

(2) after the melt being uniformly mixed, continuing to perform stirring, meanwhile, spraying and blowing $CaF_2$—$CaO$—$TiO_2$—$V_2O_5$ based refining slags into the uniformly-mixed melt with high-purity inert gas as carrier gas, wherein the mass ratio of the aluminothermic self-propagating reaction materials to the $CaF_2$—$CaO$—$TiO_2$—$V_2O_5$ based refining slags is 1.0:(0.02-0.08);

the $CaF_2$—$CaO$—$TiO_2$—$V_2O_5$ based refining slags containing the following chemical ingredients and mass percentages: 5%-10% of $CaF_2$, 40%-60% of CaO, 0-2% of $Na_2O$, 30%-40% of $TiO_2$, 5%-15% of $V_2O_5$ and the balance being inevitable impurities, wherein each component of CaO, $CaF_2$, $Na_2O$, $TiO_2$ and $V_2O_5$ powder contained in $CaF_2$—$CaO$—$TiO_2$—$V_2O_5$ based refining slags has a particle size no larger than 0.2 mm; and (3) after spraying and blowing the $CaF_2$—CaO—$TiO_2$—$V_2O_5$ based refining slags, performing heat insulation at 1700-1800° C. and continuously stirring by an eccentrically mechanical stirring for 10-30 minutes, so as to obtain titanium alloy melt; and Step 5: Cooling cooling the titanium alloy melt to room temperature, and then removing the melting slags on the top to obtain titanium alloys.

The titanium alloys prepared by the present invention contain the following chemical ingredients and mass percentages: 5.5%-6.5% of Al, 3.5%-4.5% of V, 0.2%-1.0% of Si, 0.2%-1.0% of Fe, O≤0.9% and the balance being Ti.

In the step 1, the aluminothermic reduction reaction materials being pre-treated separately as follows:

(1) roasting the titanium-containing material, $V_2O_5$ powder and CaO individually at a temperature no less than 120° C. for 12-36 hours; and (2) drying $KClO_3$ at 150-300° C. for 12-48 hours.

In the step 2, the number of several parts is n, wherein n is no less than 4.

In the step 3, an equipment for electromagnetic induction is a medium-frequency induction furnace, and the frequency of the electromagnetic field is no less than 1000 Hz.

In the step 4, the eccentricity of the eccentrically mechanical stirring is 0.2-0.4.

In the step 4, the spraying and blowing are preferably performed at the bottom of the medium-frequency induction furnace.

In the step 4, the high-purity inert gas is high-purity argon, wherein the purity is no less than 99.95%.

In the step 4(2), the $CaF_2$—CaO—$TiO_2$—$V_2O_5$ based refining slags are pre-treated before being used, wherein the roasting temperature is 150-450° C., and the roasting time is 10-48 hours.

Compared with the vacuum consumable arc melting method or the elements blending method for preparing titanium alloys, the method for preparing titanium alloys based on aluminothermic self-propagating gradient reduction and slag-washing refining disclosed by the present invention has the following notable progresses and advantages:

1. The present invention provides a new idea for preparing titanium alloys from rutile, high-titanium slags or titanium dioxide, with aluminum powder and $V_2O_5$ powder as raw materials based on aluminothermic reduction and slag washing refining, which has the advantages of short flow, low energy consumption, easy operation, easy control of Al and V content in the alloys, and the like.

2. Firstly, materials with aluminum assigning factors higher than the stoichiometric ratio are used for the aluminothermic self-propagating reaction to obtain high-temperature melt with a higher temperature, which is beneficial for initiating the reaction of subsequent materials with low aluminum assigning factors.

3. High aluminum assigning factors guarantee strong reducing atmosphere in the obtained melt and guarantee complete reduction of metal oxides.

4. The aluminum assigning factors of materials are gradually reduced from a value greater than the stoichiometric ratio to a value smaller than the stoichiometric ratio, so that an excessive reducing agent combined with titanium in the melt is gradually released and gradually reacts with oxides of titanium and vanadium in the subsequently added materials with low aluminum assigning factors, which realizes an effective control of aluminum content in final products.

5. The greater the number of feeding batches is or the smaller the continuous feeding gradient is, the smaller the coefficient for gradient changes of the amount of aluminum powder assigned is, the more obvious the gradient reducing effect is, and the higher the yield of alloy is; and besides, the temperature of the reaction process can be controlled by adjustment of the feeding speed.

6. In a slag washing refining process, by adjusting the alkalinity and the melting point of the slags with added refining slags, the viscosity of slags is reduced, the fluidity of slags is increased, slag-metal interfacial chemical reaction and complete slag-metal separation are realized, and impurities such as aluminum oxides are effectively removed; and besides, the reaction heat of a system is fully utilized in the heat insulation, melting and slag washing refining process, so that the energy consumption is reduced.

7. The slag washing refining is performed through electromagnetic induction heating, with an additionally eccentrically mechanical stirring, which results in an upper layer of aluminum oxide based melting slags and a lower layer of metal melt, whereby the slag-metal separation process is strengthened.

DETAILED DESCRIPTION OF THE INVENTION

The present invention is further described as below in corporation with embodiments.

In the following embodiments:

In the titanium-containing materials: rutile contains a mass percentage of $TiO_2$≥92% and the balance being impurities, the particle size of rutile being no larger than 3 mm; high-titanium slags contain a mass percentage of $TiO_2$≥92% and the balance being impurities, the particle size of high-titanium slags being no larger than 3 mm; titanium dioxide contains a mass percentage of $TiO_2$≥99.5% and the balance being impurities, the particle size of titanium dioxide being no larger than 0.02 mm.

The particle size of $V_2O_5$ powder is no larger than 0.2 mm.

The particle size of aluminum powder is no larger than 2 mm.

The particle size of a slag forming agent is no larger than 0.2 mm.

The purity of high purity argon is greater than 99.95%.

In the following embodiments, a medium frequency induction furnace is adopted as an equipment in the melt separation and the slag washing refining process. The frequency of the electromagnetic field in the medium-frequency induction furnace is not lower than 1000 Hz.

Embodiment 1

The method for preparing titanium alloys based on aluminothermic self-propagating gradient reduction and slag-washing refining specially comprises the following steps:

Step 1: Material Pre-Treatment

Aluminothermic reduction reaction materials were pre-treated separately. In particular, high-titanium slags in which the mass percentage of $TiO_2$ is 92% and $V_2O_5$ powder were roasted separately at 600° C. for 32 hours, CaO was roasted at 200° C. for 16 hours, and $KClO_3$ was dried at 160° C. for 18 hours, to obtain pre-treated aluminothermic reduction reaction materials.

The pre-treated aluminothermic reduction reaction materials were weighed with a proportional ratio, wherein the proportional ratio is the mass ratio of high-titanium slags to aluminum powder to $V_2O_5$ powder to CaO to $KClO_3$ being 1.0:0.26:0.045:0.16:0.28.

Among the aluminothermic reduction reaction materials, the particle size of each of the materials is as follows: the high-titanium slags are no larger than 3 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The weighed aluminothermic self-propagating reaction materials other than aluminum powder were mixed uniformly to obtain a material mixture, the material mixture was divided into 5 parts.

Aluminum powder was assigned to each part of the material mixture according to the sequence of each part of the material mixture fed into a reaction furnace, wherein the amount of aluminium powder assigned is sequentially 1.20, 1.05, 1.0, 0.90 and 0.85 times of the stoichiometric ratio. The total mass of the amount of aluminum powder added obtained from a chemical reaction equation is a theoretical total mass $m_t$, and the actual total mass of the addition of aluminum powder is $m_a$, wherein $$m_a = m_t \times 95\%.$$

Wherein the mass of a part of the material mixture that was fed into the reaction furnace as a first batch accounts for 20% of the mass of the total material mixture, and the first batch of the material mixture requires an addition of magnesium powder as an ignition substance to ignite the material mixture to induce a self-propagating reaction, so that a first-batch high-temperature melt that is sufficient to initiate subsequent reactions was obtained.

After that, other parts of the material mixture were sequentially fed into the reaction furnace according to a sequence with reduced stoichiometric ratio of the amount of aluminium powder assigned until all materials were fully reacted to obtain high-temperature melt.

Step 3: Melt Separation Under Electromagnetic Field

The high-temperature melt was heated through electromagnetic induction to perform heat insulation and melt separation, thereby slag-metal separation was realized and a layered melt with an upper layer being aluminum oxide based melt slags and a lower layer being alloy melt was obtained, wherein the temperature was controlled at 1800° C. and the heat insulation time was 15 minutes in the melt separation process.

Step 4: Slag Washing Refining (1) 90% of the total volume of the aluminum oxide based melt slags at the upper layer was removed, the remaining aluminum oxide based melt slags and the alloy melt at the lower layer were stirred by an eccentrically mechanical stirring with an eccentricity of 0.3 and at a stirring speed of 50 rpm under a temperature of 1800° C.

(2) After the melt was uniformly mixed, the stirring was continuously performed, and $CaF_2$—CaO—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—CaO—$TiO_2$—$V_2O_5$ based refining slags is 1.0:0.02.

The $CaF_2$—CaO—$TiO_2$—$V_2O_5$ based refining slags contain the following chemical ingredients and mass percentages: 5% of $CaF_2$, 60% of CaO, 0% of $Na_2O$, 30% of $TiO_2$, and 5% of $V_2O_5$, wherein each component of CaO, $CaF_2$, $Na_2O$, $TiO_2$ and $V_2O_5$ powder contained in the $CaF_2$—CaO—$TiO_2$—$V_2O_5$ based refining slags has a particle size no larger than 0.2 mm. The $CaF_2$—CaO—$TiO_2$—$V_2O_5$ based refining slags were pre-treated before being used. Roasting was performed at a roasting temperature of 150° C. for 10 hours.

(3) After the $CaF_2$—CaO—$TiO_2$—$V_2O_5$ based refining slags were sprayed and blown, the heat insulation at 1800° C. is kept and the continuously eccentrically mechanical stirring are performed for 10 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 6.2% of Al, 3.50% of V, 0.2% of Si, 0.2% of Fe, 0.32% of O, and the balance being Ti.

Embodiment 2

The method for preparing titanium alloys based on aluminothermic self-propagating gradient reduction and slag-washing refining specially comprises the following steps:

Step 1: Material Pre-Treatment

Aluminothermic reduction reaction materials were pre-treated separately. In particular, titanium dioxide containing a mass percentage of 99.5% of $TiO_2$, and $V_2O_5$ powder, were roasted separately at 650° C. for 36 hours, CaO was roasted at 200° C. for 8 hours, and $KClO_3$ were dried at 160° C. for 18 hours, to obtain pre-treated aluminothermic reduction reaction materials.

The pre-treated aluminothermic reduction reaction materials were weighed with a proportional ratio, wherein the proportional ratio is the mass ratio of titanium dioxide to aluminum powder to $V_2O_5$ powder to CaO to $KClO_3$ being 1.0:0.26:0.045:0.16:0.28.

Among the aluminothermic reduction reaction materials, the particle size of each of the materials is as follows: titanium dioxide is no larger than 0.02 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The weighed aluminothermic self-propagating reaction materials other than aluminum powder were mixed uniformly to obtain a material mixture, the material mixture was divided into 6 parts.

Aluminum powder was assigned to each part of the material mixture according to the sequence of each part of the material mixture fed into a reaction furnace, wherein the amount of aluminium powder assigned is sequentially 1.20, 1.1, 0.95, 0.90, 0.85 and 0.80 times of the stoichiometric ratio. The total mass of the amount of aluminum powder added obtained from a chemical reaction equation is a theoretical total mass $m_t$, and the actual total mass of the addition of aluminum powder is $m_a$, wherein $$m_a = m_t \times 98\%.$$

Wherein the mass of a part of the material mixture that was fed into the reaction furnace as a first batch accounts for 28.6% of the mass of the total material mixture, and the first batch of the material mixture requires an addition of magnesium powder as an ignition substance to ignite the material mixture to induce a self-propagating reaction, so that a first-batch high-temperature melt that is sufficient to initiate subsequent reactions was obtained.

After that, other parts of the material mixture were sequentially fed into the reaction furnace according to a sequence with reduced stoichiometric ratio of the amount of aluminium powder assigned until all materials were fully reacted to obtain high-temperature melt.

Step 3: Melt Separation Under Electromagnetic Field

The high-temperature melt was heated through electromagnetic induction to perform heat insulation and melt separation, thereby slag-metal separation was realized and a layered melt with an upper layer being aluminum oxide based melt slags and a lower layer being alloy melt was obtained, wherein the temperature was controlled at 1750° C. and the heat insulation time was 20 minutes in the melt separation process.

Step 4: Slag Washing Refining (1) 95% of the total volume of the aluminum oxide based melt slags at the upper layer was removed, the remaining aluminum oxide based melt slags and the alloy melt at the lower layer were stirred by an eccentrically mechanical stirring with an eccentricity of 0.2 and at a stirring speed of 100 rpm under a temperature of 1750° C.

(2) After the melt was uniformly mixed, the stirring was continuously performed, and $CaF_2$—$CaO$—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—$CaO$—$TiO_2$—$V_2O_5$ based refining slags is 1.0:0.04.

The $CaF_2$—$CaO$—$TiO_2$—$V_2O_5$ based refining slags contain the following chemical ingredients and mass percentages: 10% of $CaF_2$, 50% of $CaO$, 0% of $Na_2O$, 30% of $TiO_2$, and 10% of $V_2O_5$, wherein each component of $CaO$, $CaF_2$, $Na_2O$, $TiO_2$ and $V_2O_5$ powder contained in the $CaF_2$—$CaO$—$TiO_2$—$V_2O_5$ based refining slags has a particle size no larger than 0.2 mm. The $CaF_2$—$CaO$—$TiO_2$—$V_2O_5$ based refining slags were pre-treated before being used. Roasting was performed at a roasting temperature of 150° C. for 20 hours.

(3) After the $CaF_2$—$CaO$—$TiO_2$—$V_2O_5$ based refining slags were sprayed and blown, the heat insulation at 1750° C. is kept, and the continuously eccentrically mechanical stirring is performed for 30 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 6.0% of Al, 3.80% of V, 0.3% of Si, 0.6% of Fe, 0.24% of O and the balance being Ti.

Embodiment 3

The method for preparing titanium alloys based on aluminothermic self-propagating gradient reduction and slag-washing refining specially comprises the following steps:

Step 1: Material Pre-Treatment

Aluminothermic reduction reaction materials were pre-treated separately. In particular, rutile containing a mass percentage of 92% of $TiO_2$, and $V_2O_5$ powder, were roasted separately at 600° C. for 24 hours, CaO was roasted at 300° C. for 12 hours, and $KClO_3$ was dried at 200° C. for 18 hours, to obtain pre-treated aluminothermic reduction reaction materials.

The pre-treated aluminothermic reduction reaction materials were weighed with a proportional ratio, wherein the proportional ratio is the mass ratio of rutile to aluminum powder to $V_2O_5$ powder to CaO to $KClO_3$ being 1.0:0.26:0.045:0.16:0.28.

Among the aluminothermic reduction reaction materials, the particle size of each of the materials is as follows: rutile is no larger than 3 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The weighed aluminothermic self-propagating reaction materials other than aluminum powder were mixed uniformly to obtain a material mixture, the material mixture was divided into 8 parts.

Aluminum powder was assigned to each part of the material mixture according to the sequence of each part of the material mixture fed into a reaction furnace, wherein the amount of aluminium powder assigned is sequentially 1.20, 1.1, 1.0, 0.95, 0.925, 0.90, 0.875 and 0.85 times of the stoichiometric ratio. The total mass of the amount of aluminum powder added obtained from a chemical reaction equation is a theoretical total mass $m_t$, and the actual total mass of the addition of aluminum powder is $m_a$, wherein $m_a = m_t \times 99\%$.

Wherein the mass of a part of the material mixture that was fed into the reaction furnace as a first batch accounts for 22.2% of the mass of the total material mixture, and the first batch of the material mixture requires an addition of magnesium powder as an ignition substance to ignite the material mixture to induce a self-propagating reaction, so that a first-batch high-temperature melt that is sufficient to initiate subsequent reactions was obtained.

After that, other parts of the material mixture were sequentially fed into the reaction furnace according to a sequence with reduced stoichiometric ratio of the amount of aluminium powder assigned until all materials were fully reacted to obtain high-temperature melt.

Step 3: Melt Separation Under Electromagnetic Field

The high-temperature melt was heated through electromagnetic induction to perform heat insulation and melt separation, thereby slag-metal separation was realized and a layered melt with an upper layer being aluminum oxide based melt slags and a lower layer being alloy melt was obtained, wherein the temperature was controlled at 1700° C. and the heat insulation time was 25 minutes in the melt separation process.

Step 4: Slag Washing Refining (1) 95% of the total volume of the aluminum oxide based melt slags at the upper layer was removed, the remaining aluminum oxide based melt slags and the alloy melt at the lower layer were stirred by an eccentric mechanical stirring with an eccentricity of 0.2 and at a stirring speed of 100 rpm under a temperature of 1700° C.

(2) After the melt was uniformly mixed, the stirring was continuously performed, and $CaF_2$—$CaO$—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—$CaO$—$TiO_2$—$V_2O_5$ based refining slags is 1.0:0.06.

The $CaF_2$—$CaO$—$TiO_2$—$V_2O_5$ based refining slags contain the following chemical ingredients and mass percentages: 5% of $CaF_2$, 40% of CaO, 0% of $Na_2O$, 40% of $TiO_2$, and 15% of $V_2O_5$, wherein each component of CaO, $CaF_2$, $Na_2O$, $TiO_2$ and $V_2O_5$ powder contained in the $CaF_2$—$CaO$—$TiO_2$—$V_2O_5$ based refining slags has a particle size no larger than 0.2 mm. The $CaF_2$—$CaO$—$TiO_2$—$V_2O_5$ based refining slags were pre-treated before being used. Roasting was performed at a roasting temperature of 180° C. for 20 hours.

(3) After the $CaF_2$—$CaO$—$TiO_2$—$V_2O_5$ based refining slags were sprayed and blown, the heat insulation at 1700° C. is kept, and the continuously eccentrically mechanical stirring is performed for 30 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 5.8% of Al, 4.40% of V, 0.4% of Si, 0.8% of Fe, 0.2% of O and the balance being Ti.

Embodiment 4

The method for preparing titanium alloys based on aluminothermic self-propagating gradient reduction and slag-washing refining specially comprises the following steps:

Step 1: Material Pre-Treatment

Aluminothermic reduction reaction materials were pre-treated separately. In particular, high-titanium slags containing a mass percentage of 93% of $TiO_2$, and $V_2O_5$ powder, were roasted separately at 700° C. for 12 hours, CaO was roasted at 300° C. for 36 hours, and $KClO_3$ was dried at 250° C. for 8 hours, to obtain pre-treated aluminothermic reduction reaction materials.

The pre-treated aluminothermic reduction reaction materials were weighed with a proportional ratio, wherein the proportional ratio is the mass ratio of high-titanium slags to aluminum powder to $V_2O_5$ powder to CaO to $KClO_3$ being 1.0:0.26:0.045:0.16:0.28.

Among the aluminothermic reduction reaction materials, the particle size of each of the materials is as follows: high-titanium slags are no larger than 3 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The aluminothermic self-propagating reaction materials other than aluminum powder were mixed uniformly to obtain a material mixture, and the material mixture was fed into a continuous material mixer at a constant flow rate.

Besides, aluminum powder was added into the continuous material mixer at a flow rate with reduced gradient so that the amount of aluminum powder assigned to the continuously fed material mixture is gradually reduced from 1.28 times of the stoichiometric ratio to 0.7 times of the stoichiometric ratio, wherein the times of gradient changes of the amount of aluminum powder assigned conforms the following relational formula:

$$m=(b-c)\div a \quad (1).$$

In the formula, m is the times of gradient changes of the amount of aluminium powder assigned, b is the maximum amount of aluminium powder assigned, c is the minimum amount of aluminium powder assigned, a represents a coefficient for gradient changes of the amount of aluminium powder assigned, where a is equal to 0.01. Through calculation, m is 58 times, and the time interval between gradient changes of the flow of aluminum powder is the total reaction time divided by m.

The total mass of the amount of aluminum powder added obtained from a chemical reaction equation is a theoretical total mass $m_t$, and the actual total mass of the addition of aluminum powder is $m_a$, wherein:

$$m_a = m_t \times 98\%.$$

The aluminothermic self-propagating reaction materials were mixed uniformly in the continuous material mixer, and were continuously fed into the reaction furnace for aluminothermic reduction reaction until all materials were fully reacted to obtain high-temperature melt.

Step 3: Melt Separation Under Electromagnetic Field

The high-temperature melt was heated through electromagnetic induction to perform heat insulation and melt separation, thereby slag-metal separation was realized and a layered melt with an upper layer being aluminum oxide based melt slags and a lower layer being alloy melt was obtained, wherein the temperature was controlled at 1800° C. and the heat insulation time was 15 minutes in the melt separation process.

Step 4: Slag Washing Refining (1) 85% of the total volume of the aluminum oxide based melt slags at the upper layer was removed, the remaining aluminum oxide based melt slags and the alloy melt at the lower layer were stirred by an eccentric mechanical stirring with an eccentricity of 0.4 and at a stirring speed of 50 rpm under a temperature of 1800° C.

(2) After the melt was uniformly mixed, the stirring was continuously performed, and $CaF_2$—$CaO$—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—$CaO$—$TiO_2$—$V_2O_5$ based refining slags is 1.00.05.

The $CaF_2$—$CaO$—$TiO_2$—$V_2O_5$ based refining slags contain the following chemical ingredients and mass percentages: 10% of $CaF_2$, 50% of CaO, 0% of $Na_2O$, 35% of $TiO_2$, and 5% of $V_2O_5$, wherein each component of CaO, $CaF_2$, $Na_2O$, $TiO_2$ and $V_2O_5$ powder contained in the $CaF_2$—$CaO$—$TiO_2$—$V_2O_5$ based refining slags has a particle size no larger than 0.2 mm. The $CaF_2$—$CaO$—$TiO_2$—$V_2O_5$ based refining slags were pre-treated before being used. Roasting was performed at a roasting temperature of 150° C. for 10 hours.

(3) After the $CaF_2$—$CaO$—$TiO_2$—$V_2O_5$ based refining slags were sprayed and blown, the heat insulation at 1800° C. is kept, and the continuously eccentrically mechanical stirring is performed for 20 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 6.1% of Al, 3.60% of V, 0.6% of Si, 0.7% of Fe, 0.31% of O and the balance being Ti.

Embodiment 5

The method for preparing titanium alloys based on aluminothermic self-propagating gradient reduction and slag-washing refining specially comprises the following steps:

Step 1: Material Pre-Treatment

Aluminothermic reduction reaction materials were pretreated separately. In particular, high-titanium slags containing a mass percentage of 92.5% of $TiO_2$, titanium dioxide containing a mass percentage of 99.6% of $TiO_2$, and $V_2O_5$ powder, were roasted separately at 650° C. for 20 hours, CaO was roasted at 200° C. for 12 hours, and $KClO_3$ was dried at 150° C. for 18 hours, to obtain pre-treated aluminothermic reduction reaction materials, wherein the mixing mass ratio of high-titanium slags to titanium dioxide is 1 to 1.

The pre-treated aluminothermic reduction reaction materials were weighed with a proportional ratio, wherein the proportional ratio is the mass ratio of high-titanium slags and titanium dioxide to aluminum powder to $V_2O_5$ powder to CaO to $KClO_3$ being 1.0:0.26:0.045:0.16:0.28.

Among the aluminothermic reduction reaction materials, the particle size of each of the materials is as follows: high-titanium slags is no larger than 3 mm, titanium dioxide is no larger than 0.02 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The aluminothermic self-propagating reaction materials other than aluminum powder were mixed uniformly to obtain a material mixture, and the material mixture was fed into a continuous material mixer at a constant flow rate.

Besides, aluminum powder was added into the continuous material mixer at a flow rate with reduced gradient so that the amount of aluminum powder assigned to the continuously fed material mixture is gradually reduced from 1.20 times of the stoichiometric ratio to 0.75 times of the stoichiometric ratio, wherein the times of gradient changes of the amount of aluminum powder assigned conforms the following relational formula:

$$m=(b-c)\div a \qquad (1).$$

In the formula, m is the times of gradient changes of the amount of aluminium powder assigned, b is the maximum amount of aluminium powder assigned, c is the minimum amount of aluminium powder assigned, a represents a coefficient for gradient changes of the amount of aluminium powder assigned, where a is equal to 0.003. Through calculation, m is 150 times.

The total mass of the amount of aluminum powder added obtained from a chemical reaction equation is a theoretical total mass $m_t$, and the actual total mass of the addition of aluminum powder is $m_a$, wherein:

$$m_a = m_t \times 96\%.$$

The aluminothermic self-propagating reaction materials were mixed uniformly in the continuous material mixer, and were continuously fed into the reaction furnace for aluminothermic reduction reaction until all materials were fully reacted to obtain high-temperature melt.

Step 3: Melt Separation Under Electromagnetic Field

The high-temperature melt was heated through electromagnetic induction to perform heat insulation and melt separation, thereby slag-metal separation was realized and a layered melt with an upper layer being aluminum oxide based melt slags and a lower layer being alloy melt was obtained, wherein the temperature was controlled at 1700° C. and the heat insulation time was 15 minutes in the melt separation process.

Step 4: Slag Washing Refining (1) 90% of the total volume of the aluminum oxide based melt slags at the upper layer was removed, the remaining aluminum oxide based melt slags and the alloy melt at the lower layer were stirred by an eccentrically mechanical stirring with an eccentricity of 0.4 and at a stirring speed of 150 rpm under a temperature of 1700° C.

(2) After the melt was uniformly mixed, the stirring was continuously performed, and $CaF_2$—CaO—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—CaO—$TiO_2$—$V_2O_5$ based refining slags is 1.0:0.05.

The $CaF_2$—CaO—$TiO_2$—$V_2O_5$ based refining slags contain the following chemical ingredients and mass percentages: 5% of $CaF_2$, 50% of CaO, 0% of $Na_2O$, 30% of $TiO_2$, and 10% of $V_2O_5$, wherein each component of CaO, $CaF_2$, $Na_2O$, $TiO_2$ and $V_2O_5$ powder contained in the $CaF_2$—CaO—$TiO_2$—$V_2O_5$ based refining slags has a particle size no larger than 0.2 mm. The $CaF_2$—CaO—$TiO_2$—$V_2O_5$ based refining slags were pre-treated before being used. Roasting was performed at a roasting temperature of 450° C. for 12 hours.

(3) After the $CaF_2$—CaO—$TiO_2$—$V_2O_5$ based refining slags were sprayed and blown, the heat insulation at 1700° C. is kept, and the continuously eccentrically mechanical stirring is performed for 10 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 5.8% of Al, 4.10% of V, 0.3% of Si, 0.6% of Fe, 0.22% of O and the balance being Ti.

Embodiment 6

The method for preparing titanium alloys based on aluminothermic self-propagating gradient reduction and slag-washing refining specially comprises the following steps:

Step 1: Material Pre-Treatment

Aluminothermic reduction reaction materials were pretreated separately. In particular, high-titanium slags containing a mass percentage of 93% of $TiO_2$, titanium dioxide containing a mass percentage of 99.5% of $TiO_2$, rutile containing a mass percentage of 94% of $TiO_2$, and $V_2O_5$ powder, were roasted separately at 650° C. for 36 hours, CaO was roasted at 300° C. for 16 hours, and $KClO_3$ was dried at 180° C. for 24 hours, to obtain pre-treated aluminothermic reduction reaction materials, wherein the mixing mass ratio of high-titanium slags to titanium dioxide to rutile is 1 to 1 to 1.

The pre-treated aluminothermic reduction reaction materials were weighed with a proportional ratio, wherein the proportional ratio is the mass ratio of high-titanium slags and titanium dioxide and rutile to aluminum powder to $V_2O_5$ powder to CaO to $KClO_3$ being 1.0:0.26:0.045:0.16:0.28.

Among the aluminothermic reduction reaction materials, the particle size of each of the materials is as follows: high-titanium slags are no larger than 3 mm, rutile is no larger than 3 mm, titanium dioxide is no larger than 0.02 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The aluminothermic self-propagating reaction materials other than aluminum powder were mixed uniformly to obtain a material mixture, and the material mixture was fed into a continuous material mixer at a constant flow rate.

Besides, aluminum powder were added into the continuous material mixer at a flow rate with reduced gradient so that the amount of aluminum powder assigned to the continuously fed material mixture is gradually reduced from 1.2 times of the stoichiometric ratio to 0.75 times of the stoichiometric ratio, wherein the times of gradient changes of the amount of aluminum powder assigned conforms the following relational formula:

$$m=(b-c) \div a \quad (1).$$

In the formula, m is the times of gradient changes of the amount of aluminium powder assigned, b is the maximum amount of aluminium powder assigned, c is the minimum amount of aluminium powder assigned, a represents a coefficient for gradient changes of the amount of aluminium powder assigned, where a is equal to 0.001. Through calculation, m is 450 times.

The total mass of the amount of aluminum powder added obtained from a chemical reaction equation is a theoretical total mass $m_t$, and the actual total mass of the addition of aluminum powder is $m_a$, wherein:

$$m_a = m_t \times 95\%.$$

The aluminothermic self-propagating reaction materials were mixed uniformly in the continuous material mixer, and were continuously fed into the reaction furnace for aluminothermic reduction reaction until all materials were fully reacted to obtain high-temperature melt.

Step 3: Melt Separation Under Electromagnetic Field

The high-temperature melt was heated through electromagnetic induction to perform heat insulation and melt separation, and thereby slag-metal separation was realized and a layered melt with an upper layer being aluminum oxide based melt slags and a lower layer being alloy melt was obtained, wherein the temperature was controlled at 1750° C. and the heat insulation time was 20 minutes in the melt separation process.

Step 4: Slag Washing Refining (1) 90% of the total volume of the aluminum oxide based melt slags at the upper layer was removed, the remaining aluminum oxide based melt slags and the alloy melt at the lower layer were stirred by an eccentrically mechanical stirring with an eccentricity of 0.4 and at a stirring speed of 50 rpm under a temperature of 1750° C.

(2) After the melt was uniformly mixed, the stirring was continuously performed, and $CaF_2$—CaO—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—CaO—$TiO_2$—$V_2O_5$ based refining slags is 1.0:0.06.

The $CaF_2$—CaO—$TiO_2$—$V_2O_5$ based refining slags contain the following chemical ingredients and mass percentages: 10% of $CaF_2$, 40% of CaO, 0% of $Na_2O$, 35% of $TiO_2$, and 15% of $V_2O_5$, wherein each component of CaO, $CaF_2$, $Na_2O$, $TiO_2$ and $V_2O_5$ powder contained in the $CaF_2$—CaO—$TiO_2$—$V_2O_5$ based refining slags has a particle size no larger than 0.2 mm. The $CaF_2$—CaO—$TiO_2$—$V_2O_5$ based refining slags were pre-treated before being used. Roasting was performed at a roasting temperature of 200° C. for 12 hours.

(3) After the $CaF_2$—CaO—$TiO_2$—$V_2O_5$ based refining slags were sprayed and blown, the heat insulation at 1750° C. is kept, and the continuously eccentrically mechanical stirring is performed for 30 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 5.6% of Al, 4.40% of V, 0.6% of Si, 0.8% of Fe, 0.18% of O and the balance being Ti.

Embodiment 7

The method for preparing titanium alloys based on aluminothermic self-propagating gradient reduction and slag-washing refining specially comprises the following steps:

Step 1: Material Pre-Treatment

Aluminothermic reduction reaction materials were pre-treated separately. In particular, rutile containing a mass percentage of 92% of $TiO_2$, and $V_2O_5$ powder, were roasted separately at 600° C. for 24 hours, CaO was roasted at 200° C. for 16 hours, and $KClO_3$ was dried at 180° C. for 20 hours, to obtain pre-treated aluminothermic reduction reaction materials.

The pre-treated aluminothermic reduction reaction materials were weighed with a proportional ratio, wherein the proportional ratio is the mass ratio of rutile to aluminum powder to $V_2O_5$ powder to CaO to $KClO_3$ being 1.0:0.26:0.045:0.16:0.28.

Among the aluminothermic reduction reaction materials, the particle size of each of the materials is as follows: rutile is no larger than 3 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The weighed aluminothermic self-propagating reaction materials other than aluminum powder were mixed uniformly to obtain a material mixture, the material mixture was divided into 5 parts.

Aluminum powder was assigned to each part of the material mixture according to the sequence of each part of the material mixture fed into a reaction furnace, wherein the amount of aluminium powder assigned is sequentially 1.20, 1.05, 1.0, 0.90 and 0.85 times of the stoichiometric ratio. The total mass of the amount of aluminum powder added obtained from a chemical reaction equation is a theoretical total mass $m_t$, and the actual total mass of the addition of aluminum powder is $m_a$, wherein $$m_a = m_t \times 98\%.$$

Wherein the mass of a part of the material mixture that was fed into the reaction furnace as a first batch accounts for 20% of the mass of the total material mixture, and the first batch of the material mixture requires an addition of magnesium powder as an ignition substance to ignite the material mixture to induce a self-propagating reaction, so that a first-batch high-temperature melt that is sufficient to initiate subsequent reactions was obtained.

After that, other parts of the material mixture were sequentially fed into the reaction furnace according to a sequence with reduced stoichiometric ratio of the amount of aluminium powder assigned until all materials were fully reacted to obtain high-temperature melt.

Step 3: Melt Separation Under Electromagnetic Field

The high-temperature melt was heated through electromagnetic induction to perform heat insulation and melt separation, thereby slag-metal separation was realized and a layered melt with an upper layer being aluminum oxide based melt slags and a lower layer being alloy melt was obtained, wherein the temperature was controlled at 1700° C. and the heat insulation time was 15 minutes in the melt separation process.

Step 4: Slag Washing Refining (1) 90% of the total volume of the aluminum oxide based melt slags at the upper layer was removed, the remaining aluminum oxide based melt slags and the alloy melt at the lower layer were stirred by an eccentrically mechanical stirring with an eccentricity of 0.3 and at a stirring speed of 100 rpm under a temperature of 1700° C.

(2) After the melt was uniformly mixed, the stirring was continuously performed, and $CaF_2$—$CaO$—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—$CaO$—$TiO_2$—$V_2O_5$ based refining slags is 1.0:0.04.

The $CaF_2$—$CaO$—$TiO_2$—$V_2O_5$ based refining slags contain the following chemical ingredients and mass percentages: 5% of $CaF_2$, 50% of $CaO$, 0% of $Na_2O$, 40% of $TiO_2$, and 5% of $V_2O_5$, wherein each component of $CaO$, $CaF_2$, $Na_2O$, $TiO_2$ and $V_2O_5$ powder contained in the $CaF_2$—$CaO$—$TiO_2$—$V_2O_5$ based refining slags has a particle size no larger than 0.2 mm. The $CaF_2$—$CaO$—$TiO_2$—$V_2O_5$ based refining slags were pre-treated before being used. Roasting was performed at a roasting temperature of 150° C. for 10 hours.

(3) After s the $CaF_2$—$CaO$—$TiO_2$—$V_2O_5$ based refining slags were sprayed and blown, the heat insulation at 1700° C. is kept, and the continuously eccentrically mechanical stirring is performed for 10 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 6.3% of Al, 3.70% of V, 0.4% of Si, 0.6% of Fe, 0.35% of O and the balance being Ti.

Embodiment 8

The method for preparing titanium alloys based on aluminothermic self-propagating gradient reduction and slag-washing refining specially comprises the following steps:

Step 1: Material Pre-Treatment

Aluminothermic reduction reaction materials were pre-treated separately. In particular, titanium dioxide containing a mass percentage of 99.7% of $TiO_2$, rutile containing a mass percentage of 93% of $TiO_2$, and $V_2O_5$ powder, were roasted separately at 700° C. for 16 hours, CaO was roasted at 250° C. for 16 hours, and $KClO_3$ was dried at 180° C. for 36 hours, to obtain pre-treated aluminothermic reduction reaction materials, wherein the mixing mass ratio of titanium dioxide to the rutile is 1 to 1.

The pre-treated aluminothermic reduction reaction materials were weighed with a proportional ratio, wherein the proportional ratio is the mass ratio of titanium dioxide and rutile to aluminum powder to $V_2O_5$ powder to CaO to $KClO_3$ being 1.0:0.26:0.045:0.16:0.28.

Among the aluminothermic reduction reaction materials, the particle size of each of the materials is as follows: titanium dioxide is no larger than 0.02 mm, rutile is no larger than 3 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The weighed aluminothermic self-propagating reaction materials other than aluminum powder were mixed uniformly to obtain a material mixture, the material mixture was divided into 6 parts.

Aluminum powder was assigned to each part of the material mixture according to the sequence of each part of the material mixture fed into a reaction furnace, wherein the amount of aluminium powder assigned is sequentially 1.20, 1.1, 0.95, 0.90, 0.85 and 0.80 times of the stoichiometric ratio. The total mass of the amount of aluminum powder added obtained from a chemical reaction equation is a theoretical total mass $m_t$, and the actual total mass of the addition of aluminum powder is $m_a$, wherein $$m_a = m_t \times 98\%.$$

Wherein the mass of a part of the material mixture that was fed into the reaction furnace as a first batch accounts for 28.6% of the mass of the total material mixture, and the first batch of the material mixture requires an addition of magnesium powder as an ignition substance to ignite the material mixture to induce a self-propagating reaction, so that a first-batch high-temperature melt that is sufficient to initiate subsequent reactions was obtained.

After that, other parts of the material mixture were sequentially fed into the reaction furnace according to a sequence with reduced stoichiometric ratio of the amount of aluminium powder assigned until all materials were fully reacted to obtain high-temperature melt.

Step 3: Melt Separation Under Electromagnetic Field

The high-temperature melt was heated through electromagnetic induction to perform heat insulation and melt separation, thereby slag-metal separation was realized and a layered melt with an upper layer being aluminum oxide based melt slags and a lower layer being alloy melt was obtained, wherein the temperature was controlled at 1800° C. and the heat insulation time was 15 minutes in the melt separation process.

Step 4: Slag Washing Refining (1) 95% of the total volume of the aluminum oxide based melt slags at the upper layer was removed, the remaining aluminum oxide based melt slags and the alloy melt at the lower layer were stirred by an eccentrically mechanical stirring with an eccentricity of 0.4 and at a stirring speed of 50 rpm under a temperature of 1800° C.

(2) After the melt was uniformly mixed, the stirring was continuously performed, and $CaF_2$—$CaO$—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—$CaO$—$TiO_2$—$V_2O_5$ based refining slags is 1.0:0.06.

The $CaF_2$—$CaO$—$TiO_2$—$V_2O_5$ based refining slags contain the following chemical ingredients and mass percentages: 10% of $CaF_2$, 40% of $CaO$, 0% of $Na_2O$, 40% of $TiO_2$, and 10% of $V_2O_5$, wherein each component of $CaO$, $CaF_2$, $Na_2O$, $TiO_2$ and $V_2O_5$ powder contained in the $CaF_2$—$CaO$—$TiO_2$—$V_2O_5$ based refining slags has a particle size no larger than 0.2 mm. The $CaF_2$—CaO—$TiO_2$—$V_2O_5$ based refining slags were pre-treated before being used. Roasting was performed at a roasting temperature of 150° C. for 48 hours.

(3) After the $CaF_2$—CaO—$TiO_2$—$V_2O_5$ based refining slags were sprayed and blown, the heat insulation at 1800° C. is kept, and the continuously eccentrically mechanical stirring is performed for 20 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 5.7% of Al, 4.20% of V, 0.7% of Si, 0.9% of Fe, 0.18% of O and the balance being Ti.

Embodiment 9

The method for preparing titanium alloys based on aluminothermic self-propagating gradient reduction and slag-washing refining specially comprises the following steps:

Step 1: Material Pre-Treatment

Aluminothermic reduction reaction materials were pre-treated separately. In particular, rutile containing a mass percentage of 92% of $TiO_2$, and $V_2O_5$ powder, were roasted separately at 650° C. for 16 hours, CaO was roasted at 200° C. for 16 hours, and $KClO_3$ was dried at 180° C. for 24 hours, to obtain pre-treated aluminothermic reduction reaction materials.

The pre-treated aluminothermic reduction reaction materials were weighed with a proportional ratio, wherein the proportional ratio is the mass ratio of rutile to aluminum powder to $V_2O_5$ powder to CaO to $KClO_3$ being 1.0:0.26:0.045:0.16:0.28.

Among the aluminothermic reduction reaction materials, the particle size of each of the material is as follows: rutile is no larger than 3 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The weighed aluminothermic self-propagating reaction materials other than aluminum powder were mixed uniformly to obtain a material mixture, the material mixture was divided into 8 parts.

Aluminum powder was assigned to each part of the material mixture according to the sequence of each part of the material mixture fed into a reaction furnace, wherein the amount of aluminium powder assigned is sequentially 1.20, 1.1, 1.0, 0.95, 0.925, 0.90, 0.875 and 0.85 times of the stoichiometric ratio. The total mass of the amount of aluminum powder added obtained from a chemical reaction equation is a theoretical total mass $m_t$, and the actual total mass of the addition of aluminum powder is $m_a$, wherein $$m_a = m_t \times 98\%.$$

Wherein the mass of a part of the material mixture that was fed into the reaction furnace as a first batch accounts for 22.2% of the mass of the total material mixture, and the first batch of the material mixture requires an addition of magnesium powder as an ignition substance to ignite the material mixture to induce a self-propagating reaction, so that a first-batch high-temperature melt that is sufficient to initiate subsequent reactions was obtained.

After that, other parts of the material mixture were sequentially fed into the reaction furnace according to a sequence with reduced stoichiometric ratio of the amount of aluminium powder assigned until all materials were fully reacted to obtain high-temperature melt.

Step 3: Melt Separation Under Electromagnetic Field

The high-temperature melt was heated through electromagnetic induction to perform heat insulation and melt separation, thereby slag-metal separation was realized and a layered melt with an upper layer being aluminum oxide based melt slags and a lower layer being alloy melt was obtained, wherein the temperature was controlled at 1750° C. and the heat insulation time was 15 minutes in the melt separation process.

Step 4: Slag Washing Refining (1) 95% of the total volume of the aluminum oxide based melt slags at the upper layer was removed, the remaining aluminum oxide based melt slags and the alloy melt at the lower layer were stirred by an eccentrically mechanical stirring with an eccentricity of 0.2 and at a stirring speed of 150 rpm under a temperature of 1750° C.

(2) After the melt was uniformly mixed, the stirring was continuously performed, and $CaF_2$—CaO—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—CaO—$TiO_2$—$V_2O_5$ based refining slags is 1.0:0.05.

The $CaF_2$—CaO—$TiO_2$—$V_2O_5$ based refining slags contain the following chemical ingredients and mass percentages: 5% of $CaF_2$, 50% of CaO, 0% of $Na_2O$, 30% of $TiO_2$, and 15% of $V_2O_5$, wherein each component of CaO, $CaF_2$, $Na_2O$, $TiO_2$ and $V_2O_5$ powder contained in the $CaF_2$—CaO—$TiO_2$—$V_2O_5$ based refining slags has a particle size no larger than 0.2 mm. The $CaF_2$—CaO—$TiO_2$—$V_2O_5$ based refining slags were pre-treated before being used. Roasting was performed at a roasting temperature of 180° C. for 20 hours.

(3) After the $CaF_2$—CaO—$TiO_2$—$V_2O_5$ based refining slags were sprayed and blown, the heat insulation at 1750° C. is kept, and the continuously eccentrically mechanical stirring is performed for 15 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 5.5% of Al, 4.30% of V, 0.2% of Si, 0.6% of Fe, 0.16% of O and the balance being Ti.

Embodiment 10

The method for preparing titanium alloys based on aluminothermic self-propagating gradient reduction and slag-washing refining specially comprises the following steps:

Step 1: Material Pre-Treatment

Aluminothermic reduction reaction materials were pre-treated separately. In particular, rutile containing a mass percentage of 93% of $TiO_2$, and $V_2O_5$ powder, were roasted separately at 500° C. for 24 hours, CaO was roasted at 250° C. for 12 hours, and $KClO_3$ was dried at 150° C. for 18 hours, to obtain pre-treated aluminothermic reduction reaction materials.

The pre-treated aluminothermic reduction reaction materials were weighed with a proportional ratio, wherein the proportional ratio is the mass ratio of rutile to aluminum powder to $V_2O_5$ powder to CaO to $KClO_3$ being 1.0:0.26:0.045:0.16:0.28.

Among the aluminothermic reduction reaction materials, the particle size of each of the material is as follows: rutile is no larger than 3 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The aluminothermic self-propagating reaction materials other than aluminum powder were mixed uniformly to obtain a material mixture, and the material mixture was fed into a continuous material mixer at a constant flow rate.

Besides, aluminum powder were added into the continuous material mixer at a flow rate with reduced gradient so that the amount of aluminum powder assigned to the continuously fed material mixture is gradually reduced from 1.28 times of the stoichiometric ratio to 0.78 times of the stoichiometric ratio, wherein the times of gradient changes of the amount of aluminum powder assigned conforms the following relational formula:

$$m=(b-c) \div a \qquad (1).$$

In the formula, m is the times of gradient changes of the amount of aluminium powder assigned, b is the maximum amount of aluminium powder assigned, c is the minimum amount of aluminium powder assigned, a is a coefficient for gradient changes of the amount of aluminium powder assigned, where a is equal to 0.004. Through calculation, m is 128 times, and the time interval between gradient changes of the flow of aluminum powder is the total reaction time divided by m.

The total mass of the amount of aluminum powder added obtained from a chemical reaction equation is a theoretical total mass $m_t$, and the actual total mass of the addition of aluminum powder is $m_a$, wherein:

$$m_a = m_t \times 98\%.$$

The aluminothermic self-propagating reaction materials were mixed uniformly in the continuous material mixer, and were continuously fed into the reaction furnace for aluminothermic reduction reaction until all materials were fully reacted to obtain high-temperature melt.

Step 3: Melt Separation Under Electromagnetic Field

The high-temperature melt was heated through electromagnetic induction to perform heat insulation and melt separation, and thereby slag-metal separation was realized and a layered melt with an upper layer being aluminum oxide based melt slags and a lower layer being alloy melt was obtained, wherein the temperature was controlled at 1700° C. and the heat insulation time was 20 minutes in the melt separation process.

Step 4: Slag Washing Refining (1) 85% of the total volume of the aluminum oxide based melt slags at the upper layer was removed, the remaining aluminum oxide based melt slags and the alloy melt at the lower layer were stirred by an eccentrically mechanical stirring with an eccentricity of 0.4 and at a stirring speed of 100 rpm under a temperature of 1700° C.

(2) After the melt was uniformly mixed, the stirring was continuously performed, and $CaF_2$—CaO—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—CaO—$TiO_2$—$V_2O_5$ based refining slags is 1.0:0.04.

The $CaF_2$—CaO—$TiO_2$—$V_2O_5$ based refining slags contain the following chemical ingredients and mass percentages: 5% of $CaF_2$, 49% of CaO, 1% of $Na_2O$, 40% of $TiO_2$, and 5% of $V_2O_5$, wherein each component of CaO, $CaF_2$, $Na_2O$, $TiO_2$ and $V_2O_5$ powder contained in the $CaF_2$—CaO—$TiO_2$—$V_2O_5$ based refining slags has a particle size no larger than 0.2 mm. The $CaF_2$—CaO—$TiO_2$—$V_2O_5$ based refining slags were pre-treated before being used. Roasting was performed at a roasting temperature of 150° C. for 10 hours.

(3) After the $CaF_2$—CaO—$TiO_2$—$V_2O_5$ based refining slags were sprayed and blown, the heat insulation at 1700° C. is kept, and the continuously eccentrically mechanical stirring is performed for 10 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 5.8% of Al, 4.50% of V, 0.4% of Si, 0.7% of Fe, 0.22% of O and the balance being Ti.

Embodiment 11

The method for preparing titanium alloys based on aluminothermic self-propagating gradient reduction and slag-washing refining specially comprises the following steps:

Step 1: Material Pre-Treatment

Aluminothermic reduction reaction materials were pre-treated separately. In particular, high-titanium slags containing a mass percentage of 93% of $TiO_2$, titanium dioxide containing a mass percentage of 99.8% of $TiO_2$, and $V_2O_5$ powder, were roasted separately at 550° C. for 36 hours, CaO was roasted at 250° C. for 12 hours, and $KClO_3$ was dried at 150° C. for 24 hours, to obtain pre-treated aluminothermic reduction reaction materials, wherein the mixing mass ratio of high-titanium slags to titanium dioxide is 1 to 1.

The pre-treated aluminothermic reduction reaction materials were weighed with a proportional ratio, wherein the proportional ratio is the mass ratio of high-titanium slags and titanium dioxide to aluminum powder to $V_2O_5$ powder to CaO to $KClO_3$ being 1.0:0.26:0.045:0.16:0.28.

Among the aluminothermic reduction reaction materials, the particle size of each of the materials is as follows: high-titanium slags are no larger than 3 mm, titanium dioxide is no larger than 0.02 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The aluminothermic self-propagating reaction materials other than aluminum powder were mixed uniformly to obtain a material mixture, and the material mixture was fed into a continuous material mixer at a constant flow rate.

Besides, aluminum powder were added into the continuous material mixer at a flow rate with reduced gradient so that the amount of aluminium powder assigned to the continuously fed material mixture is gradually reduced from 1.27 times of the stoichiometric ratio to 0.7 times of the stoichiometric ratio, wherein the times of gradient changes of the amount of aluminium powder assigned conforms the following relational formula:

$$m=(b-c) \div a \qquad (1).$$

In the formula, m is the times of gradient changes of the amount of aluminium powder assigned, b is the maximum amount of aluminium powder assigned, c is the minimum amount of aluminium powder assigned, a is a coefficient for gradient changes of the amount of aluminium powder assigned, where a is equal to 0.002. Through calculation, m is 285 times.

The total mass of the amount of aluminum powder added obtained from a chemical reaction equation is a theoretical total mass $m_t$, and the actual total mass of the addition of aluminum powder is $m_a$, wherein $$m_a = m_t \times 97\%.$$

The aluminothermic self-propagating reaction materials were mixed uniformly in the continuous material mixer, and were continuously fed into the reaction furnace for aluminothermic reduction reaction until all materials were fully reacted to obtain high-temperature melt.

Step 3: Melt Separation Under Electromagnetic Field

The high-temperature melt was heated through electromagnetic induction to perform heat insulation and melt separation, thereby slag-metal separation was realized and a layered melt with an upper layer being aluminum oxide based melt slags and a lower layer being alloy melt was obtained, wherein the temperature was controlled at 1750° C. and the heat insulation time was 15 minutes in the melt separation process.

Step 4: Slag Washing Refining (1) 90% of the total volume of the aluminum oxide based melt slags at the upper layer was removed, the remaining aluminum oxide based melt slags and the alloy melt at the lower layer were stirred by an eccentrically mechanical stirring with an eccentricity of 0.4 and at a stirring speed of 150 rpm under a temperature of 1750° C.

(2) After the melt was uniformly mixed, the stirring was continuously performed, and $CaF_2$—$CaO$—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—$CaO$—$TiO_2$—$V_2O_5$ based refining slags is 1.0:0.06.

The $CaF_2$—$CaO$—$TiO_2$—$V_2O_5$ based refining slags contain the following chemical ingredients and mass percentages: 10% of $CaF_2$, 43% of CaO, 2% of $Na_2O$, 35% of $TiO_2$, and 10% of $V_2O_5$, wherein each component of CaO, $CaF_2$, $Na_2O$, $TiO_2$ and $V_2O_5$ powder contained in the $CaF_2$—$CaO$—$TiO_2$—$V_2O_5$ based refining slags has a particle size no larger than 0.2 mm. The $CaF_2$—$CaO$—$TiO_2$—$V_2O_5$ based refining slags were pre-treated before being used. Roasting was performed at a roasting temperature of 200° C. for 12 hours.

(3) After the $CaF_2$—$CaO$—$TiO_2$—$V_2O_5$ based refining slags were sprayed and blown, the heat insulation at 1750° C. is kept, and the continuously eccentrically mechanical stirring is performed for 10 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 5.6% of Al, 4.0% of V, 0.7% of Si, 0.9% of Fe, 0.13% of O and the balance being Ti.

Embodiment 12

The method for preparing titanium alloys based on aluminothermic self-propagating gradient reduction and slag-washing refining specially comprises the following steps:

Step 1: Material Pre-Treatment

Aluminothermic reduction reaction materials were pre-treated separately. In particular, high-titanium slags containing a mass percentage of 92% of $TiO_2$, and $V_2O_5$ powder, were roasted separately at 700° C. for 24 hours, CaO was roasted at 250° C. for 12 hours, and $KClO_3$ was dried at 250° C. for 24 hours, to obtain pre-treated aluminothermic reduction reaction materials.

The pre-treated aluminothermic reduction reaction materials were weighed with a proportional ratio, wherein the proportional ratio is the mass ratio of high-titanium slags to aluminum powder to $V_2O_5$ powder to CaO to $KClO_3$ being 1.0:0.26:0.045:0.16:0.28.

Among the aluminothermic reduction reaction materials, the particle size of each of the materials is as follows: high-titanium slags are no larger than 3 mm, aluminum powder is no larger than 2 mm, $V_2O_5$ powder is no larger than 0.2 mm, CaO is no larger than 0.2 mm, and $KClO_3$ is no larger than 2 mm.

Step 2: Aluminothermic Self-Propagating Reaction

The aluminothermic self-propagating reaction materials other than aluminum powder were mixed uniformly to obtain a material mixture, and the material mixture was fed into a continuous material mixer at a constant flow rate.

Besides, aluminum powder were added into the continuous material mixer at a flow rate with reduced gradient so that the amount of aluminium powder assigned to the continuously fed material mixture is gradually reduced from 1.23 times of the stoichiometric ratio to 0.72 times of the stoichiometric ratio, wherein the times of gradient changes of the amount of aluminium powder assigned conforms the following relational formula:

$$m = (b - c) \qquad (1).$$

In the formula, m is the times of gradient changes of the amount of aluminium powder assigned, b is the maximum amount of aluminium powder assigned, c is the minimum amount of aluminium powder assigned, a is a coefficient for gradient changes of the amount of aluminium powder assigned, where a is equal to 0.001. Through calculation, m is 450 times.

The total mass of the amount of aluminum powder added obtained from a chemical reaction equation is a theoretical total mass $m_t$, and the actual total mass of the addition of aluminum powder is $m_a$, wherein $$m_a = m_t \times 95\%.$$

The aluminothermic self-propagating reaction materials were mixed uniformly in the continuous material mixer, and were continuously fed into the reaction furnace for aluminothermic reduction reaction until all materials were fully reacted to obtain high-temperature melt.

Step 3: Melt Separation Under Electromagnetic Field

The high-temperature melt was heated through electromagnetic induction to perform heat insulation and melt separation, and thereby slag-metal separation was realized and a layered melt with an upper layer being aluminum oxide based melt slags and a lower layer being alloy melt was obtained, wherein the temperature was controlled at 1750° C. and the heat insulation time was 15 minutes in the melt separation process.

Step 4: Slag Washing Refining (1) 90% of the total volume of the aluminum oxide based melt slags at the upper layer was removed, the remaining aluminum oxide based melt slags and the alloy melt at the lower layer were stirred by an eccentrically mechanical stirring with an eccentricity of 0.4 and at a stirring speed of 50 rpm under a temperature of 1750° C.

(2) After the melt was uniformly mixed, the stirring was continuously performed, and $CaF_2$—$CaO$—$TiO_2$—$V_2O_5$ based refining slags were sprayed and blown into the uniformly-mixed melt from the bottom of a medium-frequency induction furnace by taking high-purity inert gas as carrier gas, wherein the mass ratio of the aluminothermic self-propagating reaction materials to the $CaF_2$—$CaO$—$TiO_2$—$V_2O_5$ based refining slags is 1.0:0.07.

The $CaF_2$—$CaO$—$TiO_2$—$V_2O_5$ based refining slags contain the following chemical ingredients and mass percentages: 5% of $CaF_2$, 49% of $CaO$, 1% of $Na_2O$, 30% of $TiO_2$, and 15% of $V_2O_5$, wherein each component of $CaO$, $CaF_2$, $Na_2O$, $TiO_2$ and $V_2O_5$ powder contained in the $CaF_2$—$CaO$—$TiO_2$—$V_2O_5$ based refining slags has a particle size no larger than 0.2 mm. The $CaF_2$—$CaO$—$TiO_2$—$V_2O_5$ based refining slags were pre-treated before being used. Roasting is performed at a roasting temperature of 200° C. for 24 hours.

(3) After the $CaF_2$—$CaO$—$TiO_2$—$V_2O_5$ based refining slags were sprayed and blown, the heat insulation at 1750° C. is kept, and the continuously eccentrically mechanical stirring is performed for 10 minutes, and then stopped to obtain titanium alloy melt.

Step 5: Cooling

The titanium alloy melt was cooled to room temperature, and the melting slags on the top were removed to obtain titanium alloys.

The titanium alloys prepared by the present invention contain the following chemical ingredients and mass percentages: 5.5% of Al, 3.60% of V, 0.4% of Si, 0.9% of Fe, 0.10% of O and the balance being Ti.

What is claimed is:

1. A method for preparing titanium alloys based on aluminothermic self-propagating gradient reduction and slag-washing refining, comprising the following steps:

Step 1: material pre-treatment pre-treating aluminothermic reduction reaction materials separately to obtain pre-treated aluminothermic reduction reaction materials, wherein the aluminothermic reduction reaction materials include titanium-containing material, aluminum powder, $V_2O_5$ powder, CaO and $KClO_3$, the titanium-containing material is at least one selected from the group consisting of rutile, titanium slags and titanium dioxide;

weighing the pre-treated aluminothermic reduction reaction materials with a proportional ratio, wherein the proportional ratio is a mass ratio of titanium-containing material:aluminum powder:$V_2O_5$ powder:CaO:$KClO_3$ being 1.0:(0.60-0.24):(0.042-0.048):(0.12-0.26):(0.22-0.30), respectively;

wherein a particle size of the pre-treated aluminothermic reduction reaction materials is as follow: rutile and titanium slags no larger than 3 mm, titanium dioxide no larger than 0.02 mm, and aluminum powder, $V_2O_5$ powder, CaO and $KClO_3$ no larger than 2 mm, 0.2 mm, 0.2 mm and 2 mm, respectively;

Step 2: aluminothermic self-propagating reaction performing gradient aluminothermic reduction with one of the two following feeding manners:

feeding manner I:

mixing the weighed aluminothermic self-propagating reaction materials other than aluminum powder uniformly to obtain a material mixture, and dividing the material mixture into several parts;

then assigning aluminum powder to each part of the material mixture according to a sequence of each part of the material mixture being fed into a reaction furnace, and gradually reducing the amount of aluminium powder assigned from 1.15-1.35 times the stoichiometric ratio to 0.85-0.65 times the stoichiometric ratio;

wherein the mass of a part of the material mixture that is fed into the reaction furnace as a first batch accounts for 10-30% of the mass of the total material mixture, the first batch of the material mixture requires an addition of magnesium powder as an ignition substance to ignite the material mixture to induce a self-propagating reaction, so that a first-batch high-temperature melt, that is sufficient to initiate subsequent reactions, is obtained;

feeding other parts of the material mixture into the reaction furnace according to a sequence with reduced stoichiometric ratio of the amount of aluminium powder assigned until all materials are fully reacted to obtain a high-temperature melt; or feeding manner II:

mixing the aluminothermic self-propagating reaction materials other than aluminum powder uniformly to obtain a material mixture, and then feeding the material mixture into a continuous material mixer at a constant flow rate;

at the same time, adding aluminum powder into the continuous material mixer at a flow rate with reduced gradient, so that the amount of aluminium powder assigned to the continuously fed material mixture is gradually reduced from 1.15-1.35 times the stoichiometric ratio to 0.85-0.65 times the stoichiometric ratio, wherein the times of gradient changes of the amount of aluminium powder assigned conforms the following formula:

$$m=(b-c)\div a \qquad (1);$$

wherein, m is the times of gradient changes of the amount of aluminum powder assigned, b is the maximum amount of aluminum powder assigned, c is the minimum amount of aluminum powder assigned, a represents a coefficient for gradient changes of the amount of aluminum powder assigned, and $0<a\leq 0.04$;

mixing the aluminothermic self-propagating reaction materials uniformly in the continuous material mixer, and continuously feeding the material mixture into the reaction furnace for aluminothermic reduction until all material are fully reacted to obtain a high-temperature melt;

Step 3: melt separation under electromagnetic field heating the high-temperature melt through electromagnetic induction to perform heat insulation and melt separation, and realize slag-metal separation to obtain a layered melt with an upper layer being aluminum oxide based melt slags and a lower layer being alloy melt, wherein the temperature is controlled within the range of 1700-1800° C. and the heat insulation time is 5-25 minutes in the melt separation process;

Step 4: slag washing refining
(1) removing 85-95% of the total volume of the aluminum oxide based melt slags at the upper layer, stirring the remaining aluminum oxide based melt slags and the alloy melt at the lower layer by an eccentrically mechanical stirring at a stirring speed of 50-150 rpm under a temperature range of 1700–1800° C.;
(2) after the melt being uniformly mixed, continuously stirring, meanwhile, spraying and blowing $CaF_2$—$CaO$—$TiO_2$—$V_2O_5$ based refining slags into the uniformly-mixed melt with inert gas as carrier gas, wherein the mass ratio of the aluminothermic self-propagating reaction materials in the weighing step to the $CaF_2$—$CaO$—$TiO_2$—$V_2O_5$ based refining slags is 1.0:(0.02-0.08);
the $CaF_2$—$CaO$—$TiO_2$—$V_2O_5$ based refining slags comprise the following chemical ingredients and mass percentages: 5%-10% of $CaF_2$, 40%-60% of CaO, 0-2% of $Na_2O$, 30%-40% of $TiO_2$, 5%-15% of $V_2O_5$ and the balance being inevitable impurities, wherein each component of CaO, $CaF_2$, $Na_2O$, $TiO_2$ and $V_2O_5$ powder contained in $CaF_2$—$CaO$—$TiO_2$—$V_2O_5$ based refining slags has a particle size no larger than 0.2 mm; and
(3) after spraying and blowing the $CaF_2$—$CaO$—$TiO_2$—$V_2O_5$ based refining slags, performing heat insulation at 1700-1800° C. and continuously stirring with the eccentrically mechanical stirring for 10-30 minutes, so as to obtain a titanium alloy melt; and Step 5: cooling
cooling the titanium alloy melt to room temperature, and then removing the melting slags on a top to obtain titanium alloys.

2. The method according to claim 1, wherein the prepared titanium alloys comprise the following chemical ingredients and mass percentages: 5.5%-6.5% of Al, 3.5%-4.5% of V, 0.2%-1.0% of Si, 0.2%-1.0% of Fe, O≤0.9%, and the balance being Ti.

3. The method according to claim 1, wherein in the step 1, the aluminothermic reduction reaction materials are pre-treated separately by the following steps:
(1) roasting the titanium-containing material, $V_2O_5$ powder and CaO individually at a temperature no less than 120° C. for 12-36 hours; and
(2) drying $KClO_3$ at 150-300° C. for 12-48 hours.

4. The method according to claim 1, wherein in the step 2, the number of the several parts is n, wherein n is no less than 4.

5. The method according to claim 1, wherein in the step 3, an equipment for electromagnetic induction is a medium-frequency induction furnace, and the frequency of the electromagnetic field is no less than 1000 Hz.

6. The method according to claim 1, wherein in the step 4, an eccentricity of the eccentrically mechanical stirring is 0.2-0.4.

7. The method according to claim 1, wherein in the step 4, the spraying and blowing are performed at a bottom of the medium-frequency induction furnace.

8. The method according to claim 1, wherein in the step 4, the inert gas is argon, and the purity is no less than 99.95%.

9. The method according to claim 1, wherein in the step 4(2), the $CaF_2$—$CaO$—$TiO_2$—$V_2O_5$ based refining slags are pre-treated before being used, under a roasting temperature of 150-450° C. for a roasting time of 10-48 hours.

\* \* \* \* \*